US008849241B2

(12) United States Patent
Tarkoma (10) Patent No.: US 8,849,241 B2
(45) Date of Patent: Sep. 30, 2014

(54) METHOD AND APPARATUS FOR PROVIDING ENERGY-AWARE CONNECTION AND CODE OFFLOADING

(75) Inventor: Sasu Tarkoma, Helsinki (FI)

(73) Assignee: Nokia Corporation, Espoo (FI)

( * ) Notice: Subject to any disclaimer, the term of this patent is extended or adjusted under 35 U.S.C. 154(b) by 1129 days.

(21) Appl. No.: 12/824,878

(22) Filed: Jun. 28, 2010

(65) Prior Publication Data

US 2011/0316663 A1 Dec. 29, 2011

(51) Int. Cl.
*H04M 11/00* (2006.01)
*G06F 15/16* (2006.01)
*G06F 9/50* (2006.01)
*G06F 1/32* (2006.01)
*H04W 52/02* (2009.01)

(52) U.S. Cl.
CPC ......... *H04W 52/0216* (2013.01); *G06F 9/5094* (2013.01); *G06F 1/3206* (2013.01); *H04W 52/0264* (2013.01); *Y02B 60/50* (2013.01); *H04W 52/0219* (2013.01); *G06F 1/329* (2013.01)
USPC ............................ 455/405; 455/406; 709/204

(58) Field of Classification Search
USPC ........................................................ 709/204
See application file for complete search history.

(56) References Cited

U.S. PATENT DOCUMENTS

| 2010/0131592 | A1  | 5/2010 | Zhang et al. |
| 2011/0131450 | A1* | 6/2011 | Wheeler et al. ................. 714/32 |
| 2011/0161484 | A1* | 6/2011 | Van den Bogaert et al. .. 709/224 |
| 2011/0231469 | A1* | 9/2011 | Wolman et al. ............... 709/201 |

OTHER PUBLICATIONS

Agarwal, Y. et al., *Wireless Wakeups Revisited: Energy Management for VOIP Over WI-FI Smartphones*, in MobiSys '07: Proceedings of the 5$^{th}$ International Conference on Mobile Systems, Applications and Services, New York, NY, ACM (2007), pp. 179-191
Cuervo, E. et al., *MAUI: Making Smartphones Last Longer With Code Offload*, in Proceedings of ACM MobiSys, San Francisco, CA, (2010), 14 pages.
Hong, B. et al., *Adaptive Allocation of Independent Tasks to Maximize Throughput*, IEEE Transactions on Parallel and Distributed Systems, vol. 18, No. 10, Oct. 2007, pp. 1420-1436.
Zuluaga, M. et al., *Design-Space Exploration of Resource-Sharing Solutions for Custom Instruction Set Extensions*, IEEE Transactions on Computer-aided Design of Integrated Circuits and Systems, vol. 28, No. 12, Dec. 2009, pp. 1788-1801.
International Search Report and Written Opinion for Application No. PCT/IB2011/052850 dated Oct. 20, 2011.

* cited by examiner

*Primary Examiner* — Shaq Taha
(74) *Attorney, Agent, or Firm* — Alston & Bird LLP (57) ABSTRACT

An apparatus for enabling provision of energy-aware connection and code offloading may include at least one processor and at least one memory including computer program code. The at least one memory and the computer program code may be configured, with the processor, to cause the apparatus to perform at least monitoring, at a client terminal, communications or processes associated with at least two applications of the client terminal, determining whether a trigger condition associated with the communications or processes monitored is met based at least on a directed graph defining a plurality of triggers for different applications and corresponding inputs and outputs associated with each respective trigger, and determining whether to direct an operational adjustment with respect to at least one of the communications or processes monitored based at least on profile information in response to the trigger condition being met. A corresponding method and computer program product are also provided.

20 Claims, 7 Drawing Sheets

METHOD AND APPARATUS FOR PROVIDING ENERGY-AWARE CONNECTION AND CODE OFFLOADING

TECHNOLOGICAL FIELD

Embodiments of the present invention relate generally to resource management technology and, more particularly, relate to a method and apparatus for enabling provision of energy-aware connection and code offloading.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or requests made by the user (e.g., content searching, mapping or routing services, etc.). The services may be provided from a network server or other network device, or even from the mobile terminal such as, for example, a mobile telephone, a mobile navigation system, a mobile computer, a mobile television, a mobile gaming system, etc.

Due to the ubiquitous nature of mobile electronic devices, people of all ages and education levels are now utilizing mobile terminals to communicate with other individuals or contacts, receive services and/or to share information, media and other content. Additionally, given recent advances in processing power, the availability of peripherals such as global positioning system (GPS) receivers and the development of various applications, mobile electronic devices are increasingly used by individuals for highly capable services that consume significant on-board resources. Furthermore, mobile electronic devices are also becoming popular mechanisms by which users communicate with each other and consume content.

Although the capabilities of mobile electronic devices with respect to acquiring and rendering content, enabling communication and providing services continue to improve, the fact that such devices are mobile and the market driven desire to keep such devices relatively small inevitably introduces challenges with respect to limits in battery life and processing resources. While battery life continues to improve, the pace of expansion of complexity and processing load is at least even with, and in many cases exceeds, the pace at which battery life improvements are realized. Thus, significant usage of a mobile electronic device for the services and functions described above may typically consume battery power quickly and end up forcing the user to frequently recharge the battery or limit their usage, which degrades the user experience. These limits on user activity have been frequently cited in user polls as being common problems that users report encountering.

Accordingly, it may be desirable to address some of the issues described above.

BRIEF SUMMARY

A method, apparatus and computer program product are therefore provided for enabling the provision of energy-aware connection and code off-loading. For example, some embodiments may utilize triggers that are associated with input conditions and corresponding outputs to be generated for respective input conditions being met in order to provide an application independent mechanism to provide energy-aware connection and code offloading.

In one example embodiment, a method of enabling provision of energy-aware connection and code offloading is provided. The method may include monitoring, at a client terminal, communications or processes associated with at least two applications of the client terminal, determining whether a trigger condition associated with the communications or processes monitored is met based at least on a directed graph defining a plurality of triggers for different applications and corresponding inputs and outputs associated with each respective trigger, and determining whether to direct an operational adjustment with respect to at least one of the communications or processes monitored based at least on profile information in response to the trigger condition being met.

In another example embodiment, a computer program product for enabling provision of energy-aware connection and code offloading is provided. The computer program product includes at least one computer-readable storage medium having computer-executable program code instructions stored therein. The computer-executable program code instructions may include program code instructions for monitoring, at a client terminal, communications or processes associated with at least two applications of the client terminal, determining whether a trigger condition associated with the communications or processes monitored is met based at least on a directed graph defining a plurality of triggers for different applications and corresponding inputs and outputs associated with each respective trigger, and determining whether to direct an operational adjustment with respect to at least one of the communications or processes monitored based at least on profile information in response to the trigger condition being met.

In another example embodiment, an apparatus for enabling provision of energy-aware connection and code offloading is provided. The apparatus may include at least one processor and at least one memory including computer program code. The at least one memory and the computer program code may be configured, with the processor, to cause the apparatus to perform at least monitoring, at a client terminal, communications or processes associated with at least two applications of the client terminal, determining whether a trigger condition associated with the communications or processes monitored is met based at least on a directed graph defining a plurality of triggers for different applications and corresponding inputs and outputs associated with each respective trigger, and determining whether to direct an operational adjustment with respect to at least one of the communications or processes monitored based at least on profile information in response to the trigger condition being met.

In another example embodiment, an apparatus for enabling provision of energy-aware connection and code offloading is provided. The apparatus may include means for monitoring, at a client terminal, communications or processes associated with at least two applications of the client terminal, means for determining whether a trigger condition associated with the communications or processes monitored is met based at least on a directed graph defining a plurality of triggers for different applications and corresponding inputs and outputs associated with each respective trigger, and means for determining whether to direct an operational adjustment with respect to at least one of the communications or processes monitored based at least on profile information in response to the trigger condition being met.

Embodiments of the invention may provide a method, apparatus and computer program product for employment in devices so that, for example, device users may enjoy improved user experiences with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Energy consumption is a common challenge for mobile devices as energy consumption is typically one of the most limiting performance factors for mobile computing systems. To mitigate energy consumption concerns, various different techniques have been employed. For example, some efforts have been made to move certain operations to a server instead of having such operations conducted by resources of the mobile device. In general, this process has been referred to as "cloud computing", in which shared resources can be accessed and utilized via a network (such as the Internet). Some application specific resource management techniques have been employed in the past. However, some embodiments of the present invention may provide for an application independent resource management technique that is capable of operating with respect to multiple concurrently running applications and/or multiple currently active communications of a mobile device.

Figure 1:
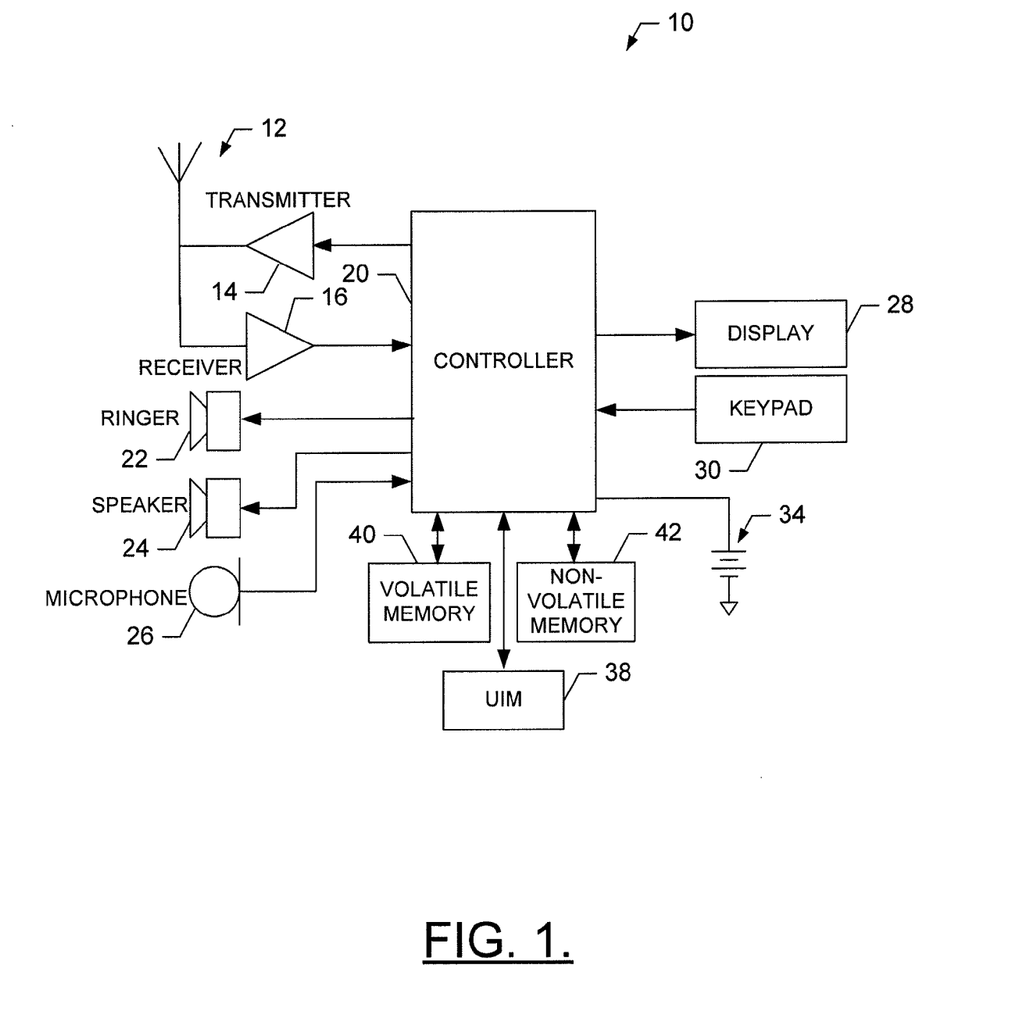
FIG. 1 is a schematic block diagram of a mobile terminal according to an example embodiment of the present invention.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
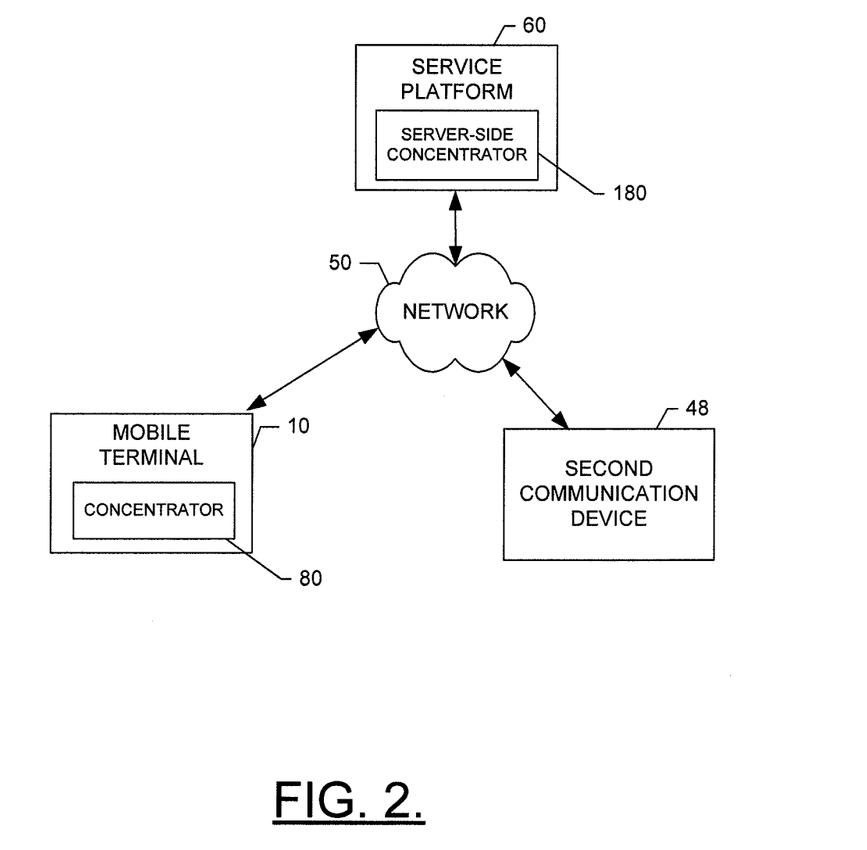
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention includes a first communication device (e.g., mobile terminal 10) and in some cases also a second communication device 48 that may each be capable of communication with a network 50. The second communication device 48 is provided as an example to illustrate potential multiplicity with respect to instances of other devices that may be included in the network 50 and that may practice example embodiments. The communications devices of the system may be able to communicate with network devices or with each other via the network 50. In some cases, the network devices with which the communication devices of the system communicate may include a service platform 60. In an example embodiment, the mobile terminal 10 (and/or the second communication device 48) is enabled to communicate with the service platform 60 to provide, request and/or receive information. However, in some embodiments, not all systems that employ embodiments of the present invention may comprise all the devices illustrated and/or described herein.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like.

One or more communication terminals such as the mobile terminal 10 and the second communication device 48 may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 48 via the network 50. By directly or indirectly connecting the mobile terminal 10, the second communication device 48 and other devices to the network 50, the mobile terminal 10 and the second communication device 48 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 48, respectively.

Furthermore, although not shown in FIG. 2, the mobile terminal 10 and the second communication device 48 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 48 may be enabled to communicate with the network 50 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 60 may be a device or node such as a server or other processing device. The service platform 60 may have any number of functions or associations with various services. As such, for example, the service platform 60 may be a platform such as a dedicated server (or server bank) associated with a particular information source or service (e.g., providing support for energy-aware connection and code offloading for one or more mobile terminals), or the service platform 60 may be a backend server associated with one or more other functions or services. As such, the service platform 60 represents a potential host for a plurality of different services or information sources. In some embodiments, the functionality of the service platform 60 is provided by hardware and/or software components configured to operate in accordance with known techniques for the provision of information to users of communication devices. However, at least some of the functionality provided by the service platform 60 is information provided in accordance with example embodiments of the present invention.

In an example embodiment, the service platform 60 may host an apparatus for providing support for energy-aware connection and code offloading for one or more mobile terminals according to an example embodiment of the present invention. As such, in some embodiments, the service platform 60 may itself perform tasks associated with the performance of example embodiments, while in other embodiments, the service platform 60 may facilitate operation of an example embodiment at another device (e.g., the mobile terminal 10 and/or the second communication device 48).

An example embodiment will now be described with reference to FIG. 3, in which certain elements of an apparatus for enabling the provision of support for energy-aware connection and code offloading for one or more mobile terminals are displayed. The apparatus of FIG. 3 may be employed, for example, on the mobile terminal 10 of FIGS. 1 and 2 (or the second communication device 48). However, it should be noted that the apparatus of FIG. 3, may also be employed on a variety of other devices. Therefore, example embodiments should not be limited to application on devices such as the mobile terminal 10 of FIG. 1. Alternatively, embodiments may be employed on a combination of devices including, for example, those listed above. Accordingly, some example embodiments may be embodied wholly at a single device (e.g., the mobile terminal 10) or by devices in a client/server relationship (e.g., the service platform 60 serving information to the mobile terminal 10). Furthermore, it should be noted that the devices or elements described below may not be mandatory and thus some may be omitted in certain embodiments.

Figure 3:
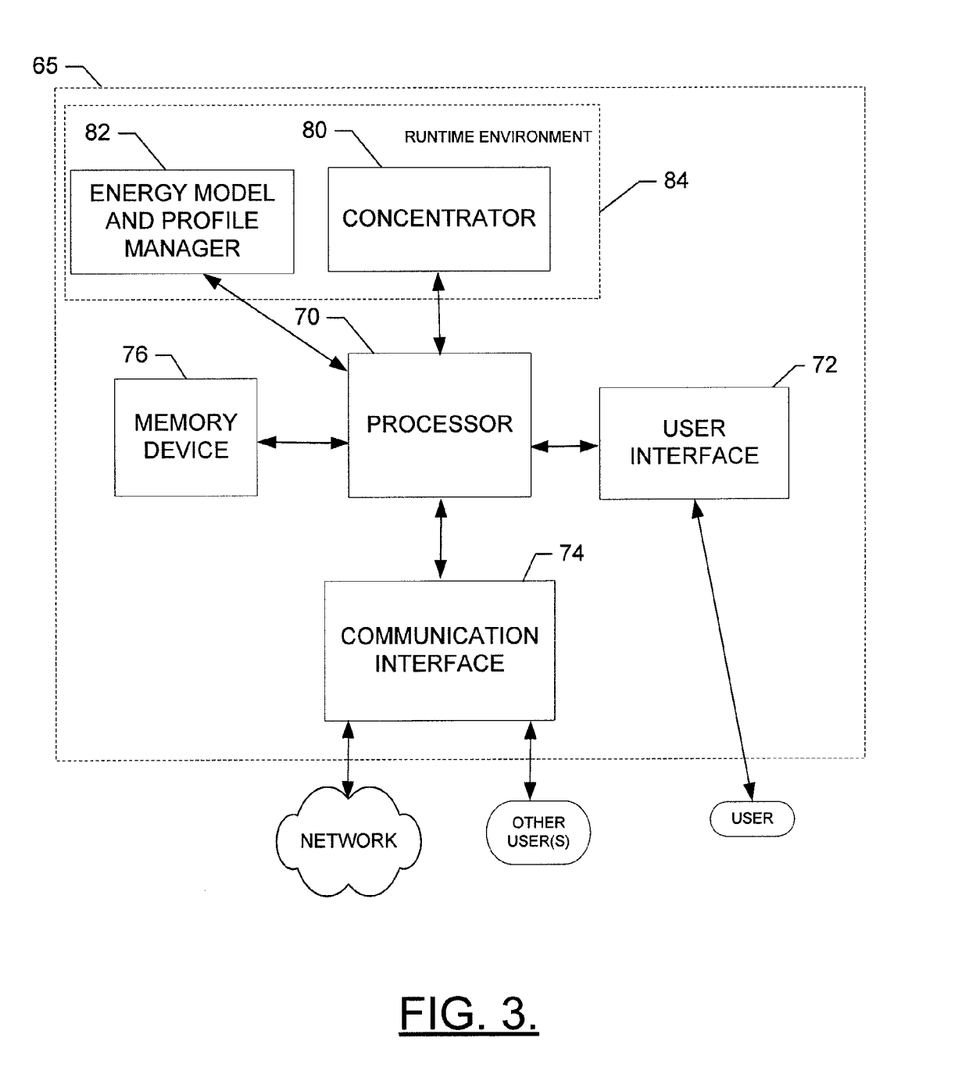
FIG. 3 is a schematic block diagram of an apparatus for enabling provision of energy-aware connection and code offloading according to an example embodiment of the present invention.

Referring now to FIG. 3, an apparatus 65 for enabling the provision of support for energy-aware connection and code offloading is provided. The apparatus 65 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 (which may be an example of the controller 20 of FIG. 1) may be embodied in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus 65 is embodied as a server or some other network devices, the user interface 72 may be limited, or eliminated. However, in an embodiment in which the apparatus 65 is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a concentrator 80 and an energy model and profile manager 82. As such, in some embodiments, the processor 70 may be said to cause, direct or control the execution or occurrence of the various functions attributed to the concentrator 80 and the energy model and profile manager 82, respectively, as described herein. The concentrator 80 and the energy model and profile manager 82 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the concentrator 80 and the energy model and profile manager 82, respectively, as described herein. Thus, in examples in which software is employed, a device or circuitry (e.g., the processor 70 in one example) executing the software forms the structure associated with such means.

The concentrator 80 and the energy model and profile manager 82 may operate within a runtime execution environment 84 on the mobile terminal 10 and may interact with any number of applications. The runtime execution environment 84 may include an event based message bus, a queue (or event heap) for future published events that are not yet to be processed, a data structure storing trigger conditions, and/or a shared temporary/persistent memory that can be accessed from trigger functions. In some embodiments, the trigger conditions may be updated when triggers with which the trigger conditions are associated are inserted, removed, activated and/or deactivated.

In an example embodiment, the concentrator 80 may be configured to monitor active processes and communications associated with the applications. In some cases, the concentrator 80 may be configured to intercept communications and buffer some intercepted communications in order to manage communication in an energy efficient manner. The management of communications may take the form of multiplexing client-initiated connections in some embodiments. As such, in some embodiments, the concentrator 80 may be configured to manage connection offloading by multiplexing client-initiated connections (e.g., those connections initiated by the mobile terminal 10) in a coordinated manner. The concentrator 80 may therefore be configured to utilize wireless information regarding wireless interface properties over multiple applications in order to improve communication efficiency. As an example, in some cases, the concentrator 80 may utilize information regarding sleep periods or other wireless interface properties in order to manage (and perhaps maximize) sleep periods or other properties (e.g., keep-alive messages) in order to improve battery life. In some embodiments, the concentrator 80 may also be configured to manage code offloading as described in greater detail below.

In an example embodiment, the concentrator 80 may be configured to handle the management of code and/or connection offloading via operation responsive to a determination as to whether certain trigger conditions have been met. The trigger conditions may be associated with corresponding applications and may include one or more declarative constructs. Each trigger, with which one or more trigger conditions may be associated, may include an input interface description and an output interface description. A trigger may be activated when trigger conditions given in the input interface description are met or satisfied. Activation of the trigger may result in corresponding logic being executed, internal state changes being made, messages or data packets being generated, and/or the like, to define an output according to the output interface description. In some cases, some triggers may have latency requirements and/or flexible timing requirements so that, for example, group trigger evaluation to be conducted in batches. When a trigger is activated, the concentrator 80 may direct or facilitate the execution of the corresponding prescribed action or actions.

In some embodiments, the triggers may have relationships with other triggers and the interface descriptions may determine the relationships. Interface compatibility between triggers may be seen as a directed graph in which the vertices of the graph are triggers and the edges of the graph are output and input relationships. Some of the interfaces may be local (e.g., with local dependencies on the mobile terminal 10) and other interfaces may have remote dependencies. The triggers may have various corresponding types (e.g., user interface views, user interface controllers, state components, Web resource fetching and processing, resource monitoring, data aggregation, etc). A trigger may have access to temporary or persistent storage (e.g., a portion of the memory device 76). Part of the state of a particular trigger may also be derived from the message or messages that activate the trigger.

The triggers may have corresponding offline and/or online profiles associated therewith. The profiles may determine the relevant costs of each respective trigger (e.g., in terms of the amount of state maintained, the expected frequency of occurrence, the amount of computation and data signaling, etc.) The relevant costs may be determined on the basis of delay and energy consumption for a given trigger. In some cases, a portion of the data regarding relevant costs may be determined when the application is created while other portions may be determined while the application is running. In an example embodiment, energy model and profile manager 82 may be configured to determine and/or maintain the profiles. The concentrator 80 may then consult the energy model and profile manager 82 for profile information in order to determine when triggers for connection offloading and/or code offloading are met. The energy model and profile manager 82 may also store a directed graph compiling a graph of the trigger conditions and corresponding inputs and outputs. In some embodiments, the granularity of the triggers may be determined during development. In general, a larger number of triggers may result in finer granularity for offloading, but may place more logic in trigger conditions, which could increase signaling.

Connection offloading may be performed by the concentrator 80 automatically via the intercepting of communications. For example, the concentrator 80 may intercept all HTTP requests and transport control protocol (TCP) connections on the HTTP/Socket level in order to multiplex these connections. In an example embodiment, the concentrator 80 may be configured to decide when packets are to be sent and/or received in order to optimize energy usage. Decisions along these lines may be made based on the triggers described above. As such, the concentrator 80 may be configured to implement a scheduling component that decides when to transmit information to increase sleep time or otherwise reduce connection related loading that may be associated with keep alive messages or other communication overhead. The concentrator 80 may then multiplex the connections during active periods to reduce overall resource depletion.

In some embodiments, certain triggers may be device specific and cannot be offloaded (e.g., sensor monitors, user interface components, etc.). However, some triggers that accept input data from device-specific triggers can be offloaded. This may be useful when a communication cost is well below the processing cost for a particular activity (or activities that are dependent on the offloaded trigger). A partition algorithm may be employed in order to maintain the directed graph. Accordingly, the concentrator 80 may be further configured to analyze conditions in order to understand the relationship between any two triggers. The directed graph may be computed when the application is built and, in some cases, may only be updated when the application is running. The directed graph may be analyzed by estimating a delay-energy product of various parts of the graph. Parts of the directed graph that may be offloaded may be marked accordingly. Parts of the graph that are offloadable and result in reasonable latency and relatively high energy gains may be considered for offloading to the "cloud" via the service platform 60.

Code offloading may include the offloading of polling operations and other frequently performed, but relatively simple operations, from the mobile terminal 10 to the "cloud" in order to reduce communications and energy costs. Code offloading may be accomplished when corresponding triggers are met. When a particular function (or code) is offloaded, a special completion token may be expected in order to denote that completion of the activity has been accomplished. The result may then be processed in a trigger function using content-specific mechanisms. To offload code, the system to which the code is to be offloaded must be capable of supporting the code to be offloaded. For example, BitTorrent downloads, different kinds of polling operations, RSS (really simple syndication) feed aggregation, file downloads and other such codes can be offloaded as long as the offloading subsystem supports the respective types of code offloaded.

Accordingly, an application may be developed and a corresponding directed graph may be generated to define the inputs and outputs for respective different triggers associated with the application (and perhaps also a plurality of other applications). The directed graph may be optimized during operation thereafter. The application may then be profiled and the profile information may be stored for concentrator 80 reference. Dynamic optimizations for energy consumption may thereafter be conducted by enabling portions of the applications processes to be offloaded as the application is executed based on the trigger conditions and corresponding costs of each trigger as indicated by the corresponding profile. The dynamic optimizations may take the form of operational adjustments with respect communications or processes that are monitored for various applications. The operational adjustments may be made based at least on profile information in response to a corresponding trigger condition being met. Some examples are described below.

Operations:

```
Install trigger<CONDITION>
Emit message<PARAMS>
Modify trigger oldtrigger<CONDITION> newtrigger<CONDITION'>
Delete trigger<CONDITION>
```

The runtime may be able to label triggers are local, remote, or both.

In an example involving a polling application, polling operation offloading may be implemented according to the model discussed above. An application may include a start trigger (that is executed first) and then one or more other triggers may request contents and react to the completion (or failure of the content retrieval). Some of the functions triggered may be associated with a specific uniform resource indicator (URI) referenced by a corresponding trigger. For example:

```
trigger: start
function: install poll<URI1> and poll<URI2> // poll is an event
install endapp<URI1 flag == true and URI2 flag == true>
trigger: endapp<URI1 flag == true and URI2 flag == true>
function: exit
trigger: poll<URI, timeout>
function:
create token for polling operation with timeout
emit URI_changed<URI, token>
end trigger
trigger: URI_changed<URI, token>
function: check if URI has changed
if yes, emit URI_changed_true<URI,token> message
else create a future event URI_changed<URI,token> after timeout
specified in token
end trigger
trigger: URI_changed_true<URI,token>
function: changed resource, perform some activities and set URI
```

```
flag = true
create a future event URI_changed<URI,token> to continue polling
```

From the example above, it can be appreciated that the polling operation may be executed remotely (URI_changed), whereas URI_changed_true may be run locally (depending on the function). Note that the local variable is set by the URI_changed_true trigger.

In some embodiments, collaborative interactive applications may be employed. Following the above example, it may be possible to distribute user interface related triggers in such a way that a collaborative interactive application is executed by a group of devices (and servers). For example, if only a part of a screen or application is shared, a remote trigger may provide that only those necessary changes are communicated over the network. Similarly, any transformations may be performed by chaining data through triggers so part of the transformations may be enabled to be performed in the cloud. In a web application example, again following the above example, a web application (e.g., implemented using AJAX (asynchronous JavaScript and XML (extensible markup language)) or Flash or a similar technology) may be mapped to a collection of triggers.

Figure 4:
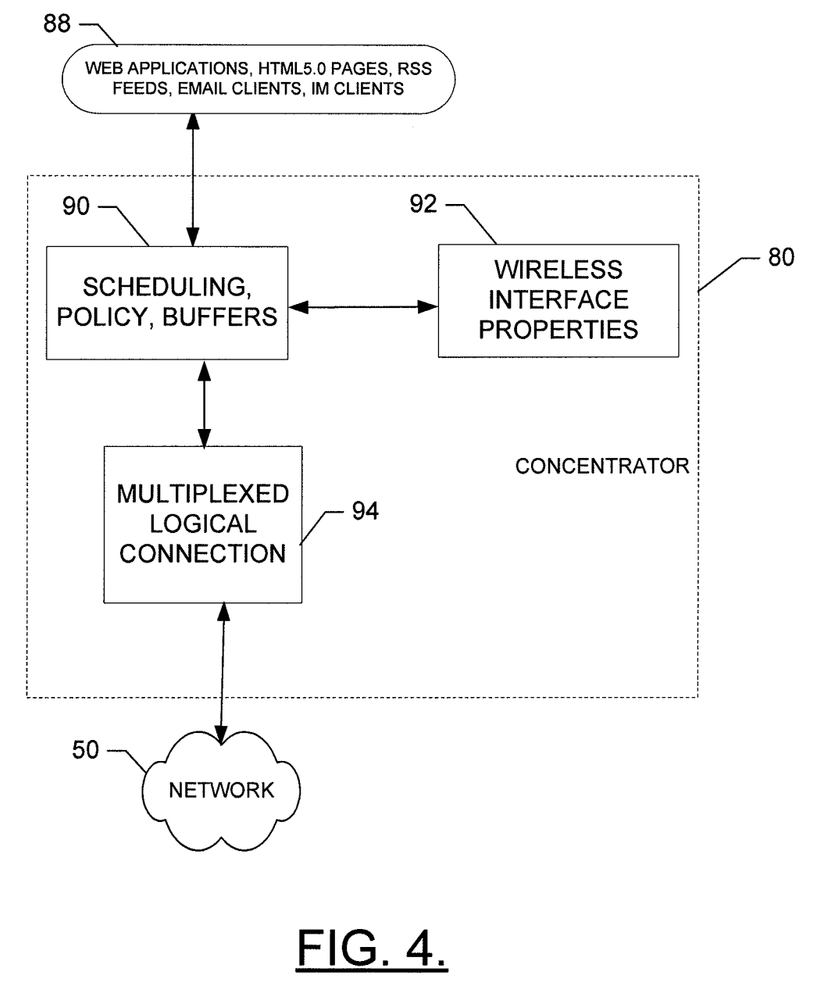
FIG. 4 illustrates an example of client-side operation of a concentrator according to an example embodiment of the present invention.

FIG. 4 illustrates an example of client-side operation of the concentrator 80 according to an example embodiment. As shown in FIG. 4, various web applications 88 may be monitored by the concentrator 80. The concentrator 80 may consult scheduling and policy data and utilize internal buffers as indicated at block 90 to store intercepted communications until such data can be sent via multiplexed connections in accordance with the scheduling and policy considerations. Wireless interface properties 92 (e.g., sleep schedules and other information) may contribute to the concentrator's application of the scheduling and policy data. The concentrator 80 may then utilize multiplexed logical connections 94 to communicate with the network 50 (e.g., a radio subsystem).

Figure 5:
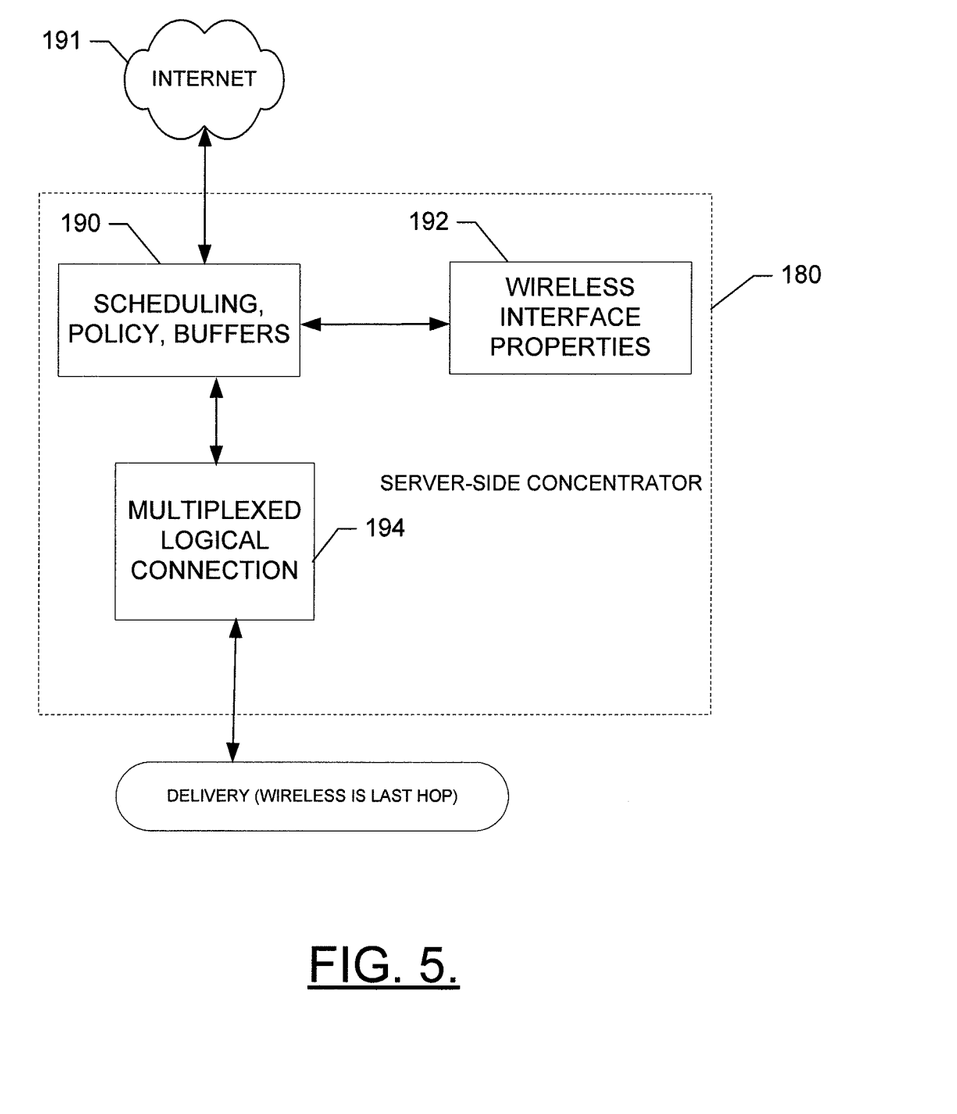
FIG. 5 illustrates an example of an apparatus that may be employed at the service platform 60 to support example embodiments of the present invention.

In an example embodiment, the concentrator 80 of the mobile terminal 10 may perform offloading, as described above, to the service platform 60. The service platform 60 may include its own instance of a concentrator (e.g., server-side concentrator 180 of FIG. 2). FIG. 5 illustrates an example of an apparatus that may be employed at the service platform 60 to support example embodiments. The apparatus may include or otherwise be in communication with a processor, a communication interface and a memory device that may each be similar in function and structure (except perhaps for semantic and scale differences) to the processor 70, communication interface 74 and memory device 76 described above in reference to apparatus 65. Accordingly, a detailed description of these components will not be provided. The apparatus may include the server-side concentrator 180 as shown in FIG. 5. The server-side concentrator 180 may be configured to schedule communications with a plurality of mobile devices and/or handle offloaded operations from the mobile devices. Thus, for example, the server-side concentrator 180 may be configured to facilitate improvement of energy consumption and increase battery life for the respective mobile terminals. As shown in FIG. 5, the server-side concentrator 180 may consult scheduling and policy data and utilize internal buffers as indicated at block 190 to store communications associated with a particular mobile terminal until such data is to be sent to the mobile terminal in accordance with the scheduling and policy considerations. In some cases, scheduling and policy related information may be available via a network such as the Internet 191. Wireless interface properties 192 (e.g., sleep schedules and other information) associated with each respective mobile terminal may contribute to the server-side concentrator's application of the scheduling and policy data. The server-side concentrator 180 may then utilize multiplexed logical connections 194 to provide delivery to the corresponding mobile terminal.

Figure 6:
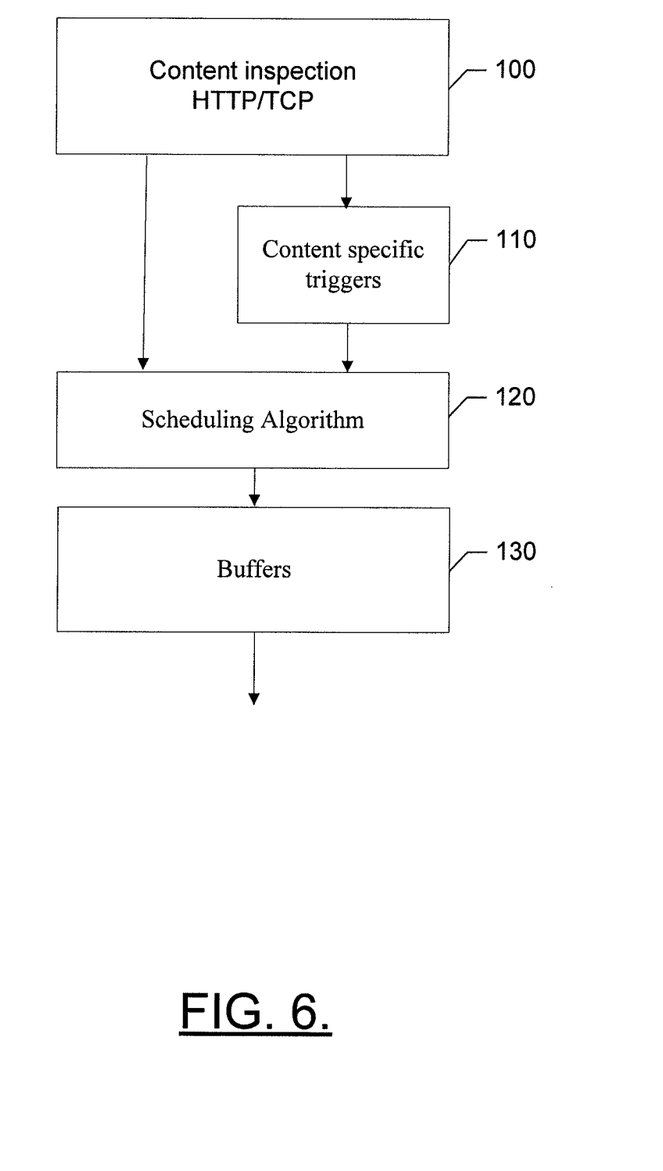
FIG. 6 is a process flow diagram showing operation of a scheduling subsystem that may be employed by a concentrator according to an example embodiment of the present invention.

FIG. 6 is a process flow diagram showing operation of a scheduling subsystem that may be employed by the concentrator 80 (or server-side concentrator 180) according to an example embodiment. As shown in FIG. 6, content may initially be inspected at operation 100. At operation 110, a determination may be made as to whether any content-specific triggers are triggered. RSS/AJAX detection, URI specific prioritizations, security operations and/or the like may be factors associated with trigger conditions evaluated for triggering the content-specific triggers. A scheduling algorithm may then be employed at operation 120 and thereafter data may be buffered according to the scheduling algorithm at operation 130 to enable delivery of communications according to the schedule determined based on reducing delay cost and energy consumption cost.

Some embodiments may therefore provide coordination and optimization with respect to operations of concurrent and independent web applications on a mobile terminal. The coordination may take into account various wireless interface properties such as, for example, sleep periods. Some embodiments may allow the placement of content-centric trigger functions that may be useful for security or other purposes.

Figure 7:
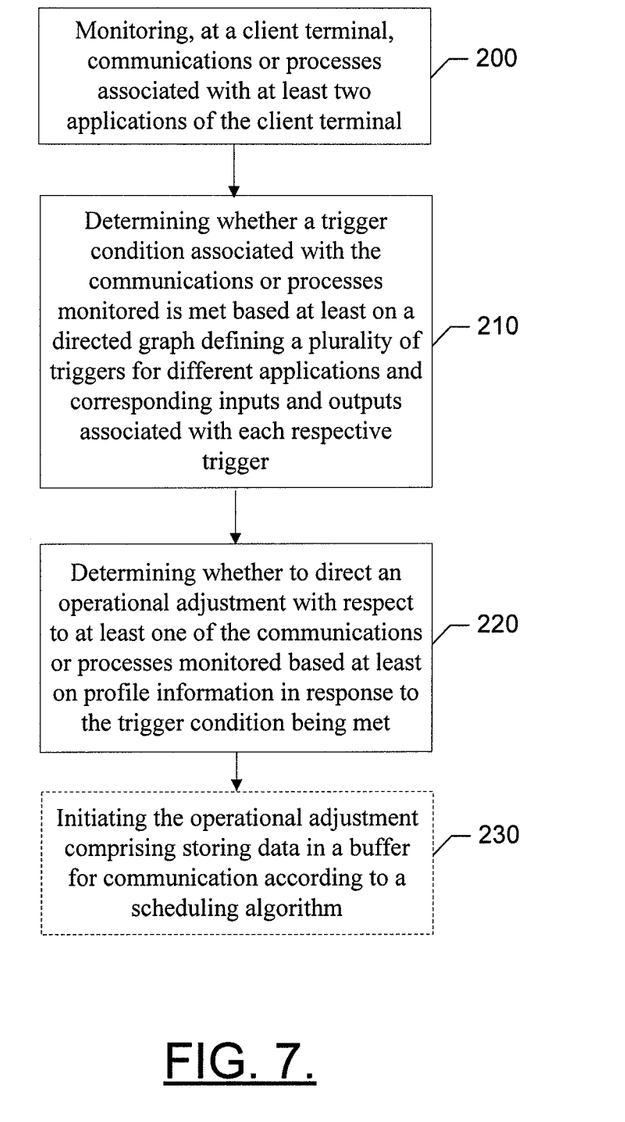
FIG. 7 is a block diagram according to an example method for enabling provision of energy-aware connection and code offloading according to an example embodiment of the present invention.

FIG. 7 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instructions for performing the specified functions.

It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method for enabling provision of energy-aware connection and code offloading may include monitoring, at a client terminal, communications or processes associated with at least two applications (e.g., two different applications or two instances of the same application) of the client terminal at operation 200, determining whether a trigger condition associated with the communications or processes monitored is met based at least on a directed graph defining a plurality of triggers for different applications and corresponding inputs and outputs associated with each respective trigger at operation 210, and determining whether to direct an operational adjustment with respect to at least one of the communications or processes monitored based at least on profile information in response to the trigger condition being met at operation 220.

In some embodiments, certain ones of the operations above may be modified or further amplified as described below. Furthermore, in some embodiments, the method may include additional optional operations, an example of which is shown in dashed lines in FIG. 7. Modifications, additions or amplifications to the operations above may be performed in any order and in any combination. In this regard, for example, the method may further include initiating the operational adjustment comprising storing data in a buffer for communication according to a scheduling algorithm at operation 230. In some embodiments, determining whether the trigger condition is met may include utilizing a modified directed graph generated with respect to a corresponding application in response to development of the application and updated during operation of the application to determine whether the trigger condition is met. In an example embodiment, determining whether to direct an operational adjustment may include determining whether to offload actions associated with a particular routine operation to network resources. In some cases, monitoring communications may include intercepting communications associated with client terminal initiated connections. In an example embodiment, determining whether to direct an operational adjustment may include determining whether to multiplex at least some of the client terminal initiated connections. In some embodiments, determining whether to direct an operational adjustment may include determining whether to initiate connection offloading or code offloading based on profile information indicative of energy cost or delay cost associated with a corresponding trigger. In some cases, determining whether the trigger condition is met may include determining whether conditions associated with an input interface description of a corresponding trigger are satisfied.

In an example embodiment, an apparatus for performing the method of FIG. 7 above may comprise one or more processors (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, corresponding ones of the processor 70, the concentrator 80, the energy model and profile manager 82 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   monitor, at a client terminal, communications or processes associated with at least two applications of the client terminal, the at least two applications being concurrent and independent;
   determine whether a trigger condition associated with the communications or processes monitored is met based at least on a directed graph, the directed graph defining a plurality of triggers for the at least two different applications and corresponding inputs and outputs associated with each respective trigger;
   determine whether to direct an operational adjustment with respect to at least one of the communications or processes monitored based at least on profile information in response to the trigger condition being met; and
   enable operational adjustment of the at least one of the communications or processes monitored based on the trigger condition and at least one corresponding cost of the trigger condition as indicated by the corresponding profile,
   the trigger conditions having corresponding offline and online profiles, wherein the corresponding offline and online profiles determine relevant costs of each respective trigger, the relevant costs determined on the basis of delay and energy consumption for a given trigger.

2. The apparatus of claim 1, wherein the memory and computer program code are configured to, with the processor, cause the apparatus to determine whether the trigger condition is met by utilizing a modified directed graph generated with respect to a corresponding application in response to development of the application and updated during operation of the application to determine whether the trigger condition is met.

3. The apparatus of claim 1, wherein the memory and computer program code are configured to, with the processor, cause the apparatus to determine whether to direct an operational adjustment by determining whether to offload actions associated with a particular routine operation to network resources.

4. The apparatus of claim 1, wherein the memory and computer program code are configured to, with the processor, cause the apparatus to monitor communications by intercepting communications associated with client terminal initiated connections.

5. The apparatus of claim 4, wherein the memory and computer program code are configured to, with the processor, cause the apparatus to determine whether to direct an operational adjustment by determining whether to multiplex at least some of the client terminal initiated connections.

6. The apparatus of claim 1, wherein the memory and computer program code are configured to, with the processor, cause the apparatus to determine whether to direct an operational adjustment by determining whether to initiate connection offloading or code offloading based on profile information indicative of energy cost or delay cost associated with a corresponding trigger.

7. The apparatus of claim 1, wherein the memory and computer program code are configured to, with the processor, cause the apparatus to determine whether the trigger condition is met by determining whether conditions associated with an input interface description of a corresponding trigger are satisfied.

8. The apparatus of claim 1, wherein the apparatus is a mobile terminal and further comprises user interface circuitry configured to facilitate user control of at least some functions of the mobile terminal.

9. The apparatus of claim 1, wherein the memory and computer program code are further configured to, with the processor, cause the apparatus to initiate the operational adjustment by storing data in a buffer for communication according to a scheduling algorithm.

10. A method comprising:
monitoring, at a client terminal, communications or processes associated with at least two applications of the client terminal, the at least two applications being concurrent and independent;
determining whether a trigger condition associated with the communications or processes monitored is met based at least on a directed graph, the directed graph defining a plurality of triggers for the at least two different applications and corresponding inputs and outputs associated with each respective trigger;
determining whether to direct an operational adjustment with respect to at least one of the communications or processes monitored based at least on profile information in response to the trigger condition being met; and
enabling operational adjustment of the at least one of the communications or processes monitored based on the trigger condition and at least one corresponding cost of the trigger condition as indicated by the corresponding profile,
the trigger conditions having corresponding offline and online profiles, wherein the corresponding offline and online profiles determine relevant costs of each respective trigger, the relevant costs determined on the basis of delay and energy consumption for a given trigger.

11. The method of claim 10, wherein determining whether the trigger condition is met comprises utilizing a modified directed graph generated with respect to a corresponding application in response to development of the application and updated during operation of the application to determine whether the trigger condition is met.

12. The method of claim 10, wherein determining whether to direct an operational adjustment comprises determining whether to offload actions associated with a particular routine operation to network resources.

13. The method of claim 10, wherein monitoring communications comprises intercepting communications associated with client terminal initiated connections.

14. The method of claim 13, wherein determining whether to direct an operational adjustment comprises determining whether to multiplex at least some of the client terminal initiated connections.

15. The method of claim 10, wherein determining whether to direct an operational adjustment comprises determining whether to initiate connection offloading or code offloading based on profile information indicative of energy cost or delay cost associated with a corresponding trigger.

16. The method of claim 10, wherein determining whether the trigger condition is met comprises determining whether conditions associated with an input interface description of a corresponding trigger are satisfied.

17. The method of claim 10, further comprising initiating the operational adjustment comprising storing data in a buffer for communication according to a scheduling algorithm.

18. A computer program product comprising at least one computer-readable storage medium having computer-executable program code instructions stored therein, the computer-executable program code instructions including program code instructions for:
monitoring, at a client terminal, communications or processes associated with at least two applications of the client terminal, the at least two applications being concurrent and independent;
determining whether a trigger condition associated with the communications or processes monitored is met based at least on a directed graph, the directed graph defining a plurality of triggers for the at least two different applications and corresponding inputs and outputs associated with each respective trigger;
determining whether to direct an operational adjustment with respect to at least one of the communications or processes monitored based at least on profile information in response to the trigger condition being met; and
enabling operational adjustment of the at least one of the communications or processes monitored based on the trigger condition and at least one corresponding cost of the trigger condition as indicated by the corresponding profile,
the trigger conditions having corresponding offline and online profiles, wherein the corresponding offline and online profiles determine relevant costs of each respective trigger, the relevant costs determined on the basis of delay and energy consumption for a given trigger.

19. The computer program product of claim 18, wherein program code instructions for determining whether to direct the operational adjustment include instructions for determining whether to initiate connection offloading or code offloading based on profile information indicative of energy cost or delay cost associated with a corresponding trigger.

20. The computer program product of claim 18, further comprising program code instructions for initiating the operational adjustment comprising storing data in a buffer for communication according to a scheduling algorithm.

* * * * *